O. G. PFEIFFER.
CLUTCH.
APPLICATION FILED JULY 14, 1913.
1,153,854.
Patented Sept. 14, 1915.
2 SHEETS—SHEET 1.
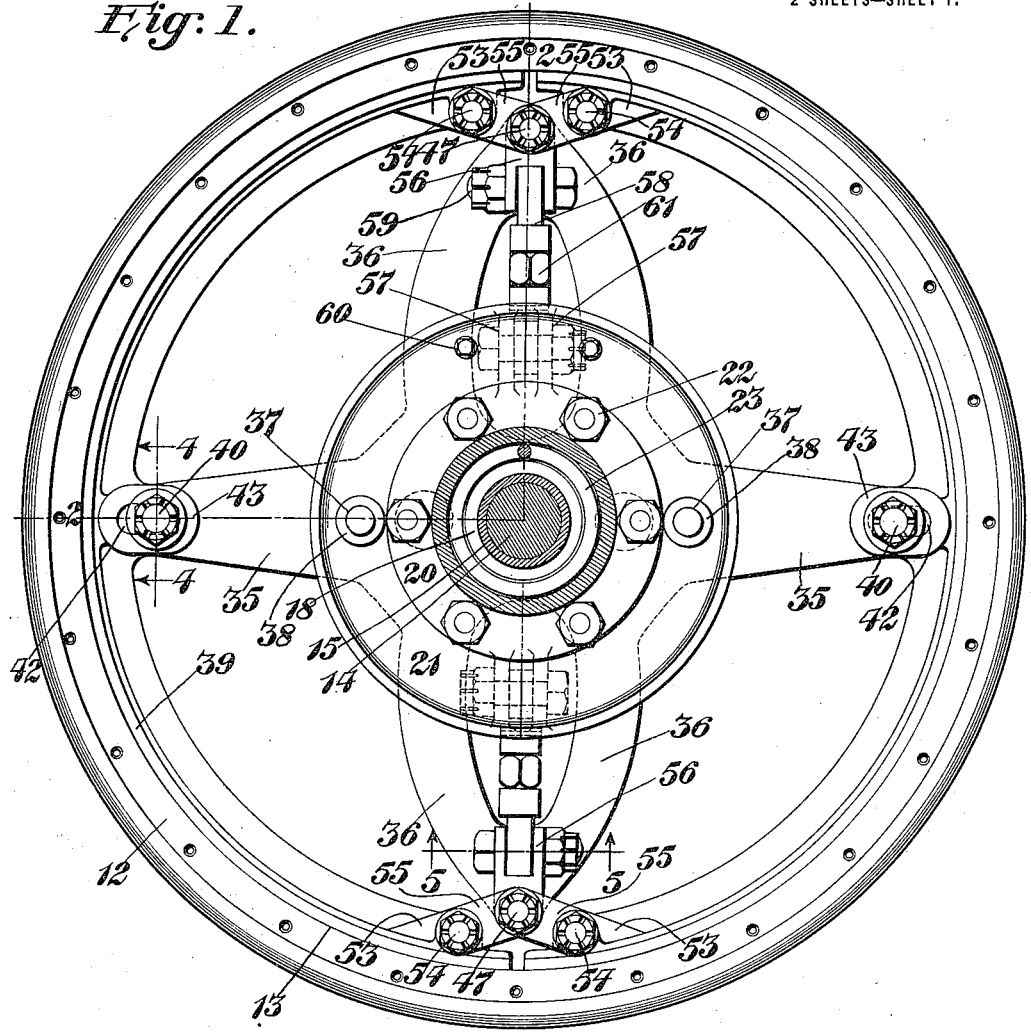
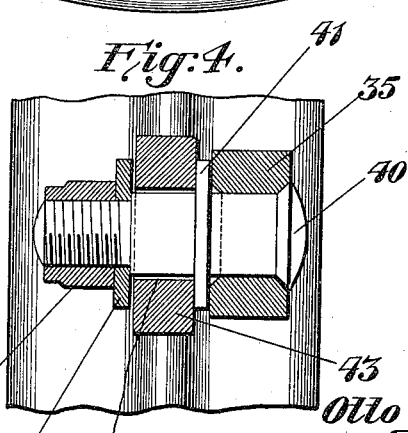
Attest:
Chas. A. Becker
O. Groebl Jr.
Inventor:
Otto G. Pfeiffer,
by John H. Bruning,
His Attorney.

O. G. PFEIFFER.
CLUTCH.
APPLICATION FILED JULY 14, 1913.
1,153,854.
Patented Sept. 14, 1915.
2 SHEETS—SHEET 2.
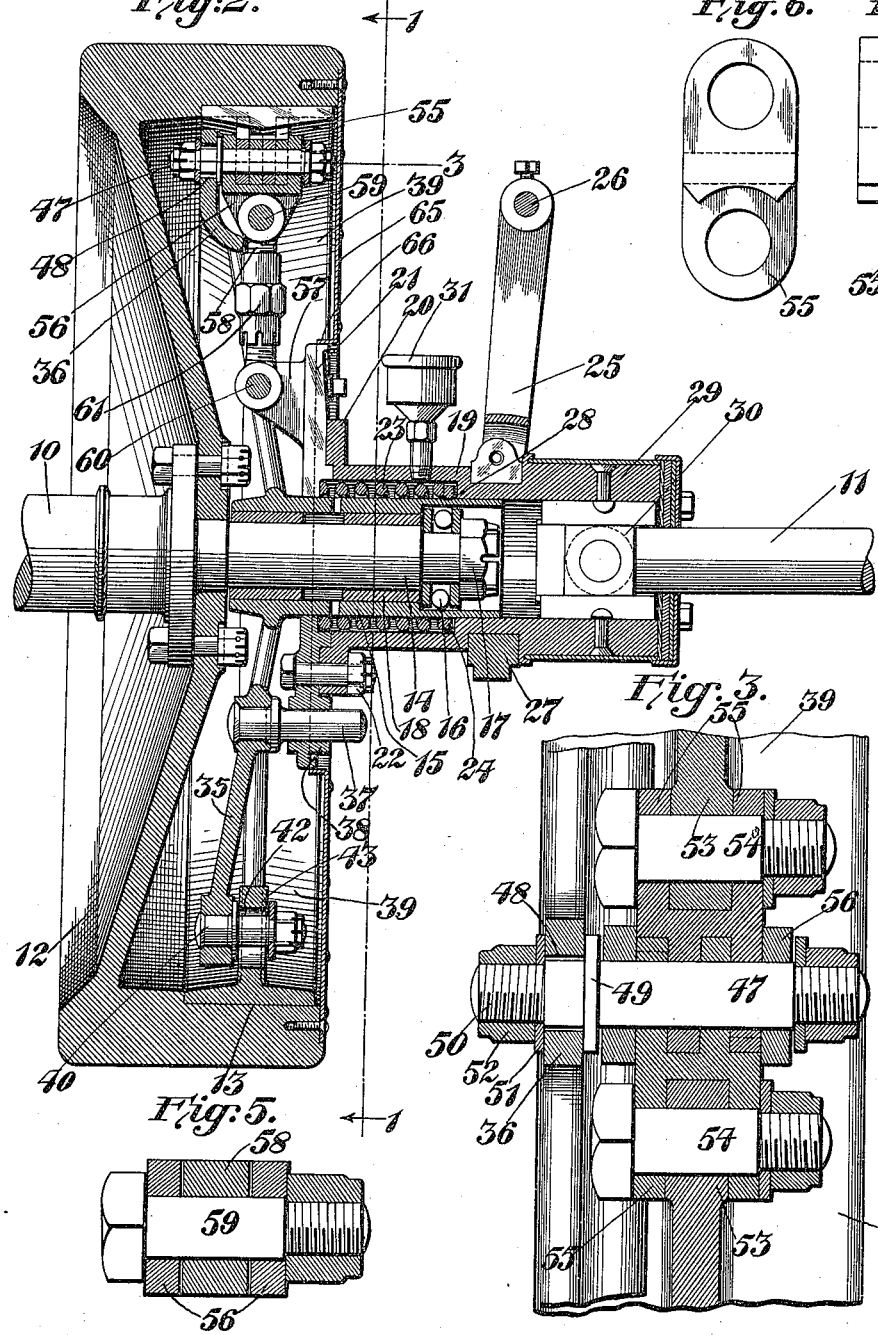
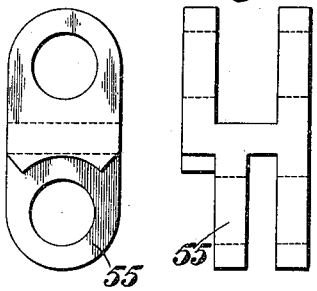
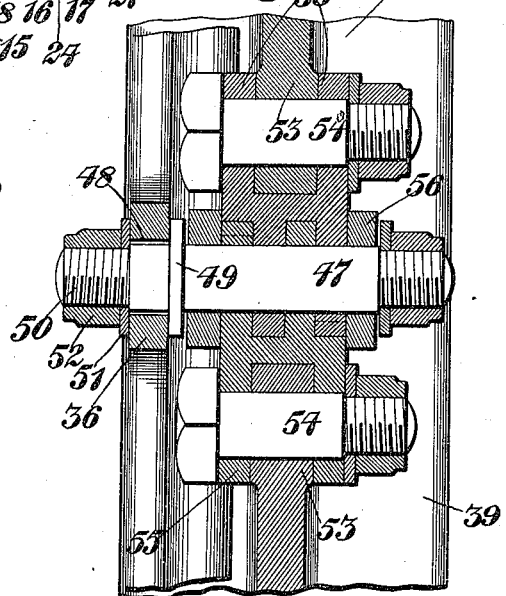
Attest:
Chas. A. Becker,
O. Froebl Jr.
Inventor:
Otto G. Pfeiffer,
by John H. Bruninga
His Attorney.

UNITED STATES PATENT OFFICE.

OTTO G. PFEIFFER, OF ST. LOUIS, MISSOURI, ASSIGNOR TO UTAHNA DEVELOPMENT COMPANY, OF SALT LAKE CITY, UTAH, A CORPORATION OF UTAH.

CLUTCH.

1,153,854.  Specification of Letters Patent.  Patented Sept. 14, 1915.

Application filed July 14, 1913. Serial No. 779,010.

*To all whom it may concern:*

Be it known that I, OTTO G. PFEIFFER, a citizen of the United States, and residing at St. Louis, in the State of Missouri, have invented certain new and useful Improvements in Clutches, of which the following is a specification.

This invention relates to clutches and more particularly to clutches of the drum and expanding band or ring type.

In clutches of the expanding or ring type as heretofore constructed, no means are provided for insuring that the band will engage the friction surface uniformly along the entire face of the band, and no means are provided for insuring that this band will be gradually applied and positively released. The result therefore is that it is never possible to utilize the entire 360° arc of contact. Moreover since the engagement is not gradual the band is liable to engage with a slap, thus causing undue strains on the mechanism.

The objects of this invention are therefore to construct a clutch in which the band will grip the drum along the entire circumferential surface of the band, and in which the gripping arc will extend uniformly for practically 360°; and which is so constructed that it can be positively and gradually engaged and released.

Further objects are to improve the clutch as to details, and further objects will appear from the detail description taken in connection with the accompanying drawings, in which:

Figure 1 is a section on the line 1—1 Fig. 2, the shield or cover being removed to show the clutch mechanism in elevation, Fig. 2 is a section on the line 2—2 Fig. 1, Fig. 3 is a section on the line 3 Fig. 2, Fig. 4 is a section on the line 4—4 Fig. 1, Fig. 5 is a section on the line 5—5 Fig. 1, Fig. 6 is a side view of one of the toggle links, and Fig. 7 is an edge view.

Referring to the accompanying drawings, 10 and 11 designate a pair of shafts, either one of which may be the driving or driven shaft. In automobile practice the shaft 10 is generally the driving shaft while 11 is the driven shaft. The shaft 10 has bolted thereon a fly wheel 12, which is machined at 13 to form an inside friction surface. The shaft 10 has formed thereon or secured thereto a stub shaft or extension 14 which supports the hub 15 of a spider through an anti-friction sleeve 18. This hub has an end bearing against a roller thrust bearing 16 mounted on a reduced portion of the stub shaft 14 and secured in position by a nut 17. A hollow shaft or sleeve 19 is mounted upon the hub 15, and this sleeve shaft has a flange 20 to which is bolted a ring 21. This ring is split along the vertical lines in Fig. 1, so as to form two halves, and these halves are secured in position by means of bolts 22 passing through the ring and the flange. The hub 15 is recessed to receive a spring 23 which bears at one end against a ring or collar 24 threaded on the hub 15, and at its other end against the ring 21. The sleeve 19 and its attached ring 21 are moved to the left Fig. 2 by means of the spring 23, and moved to the right by means of a fork 25 mounted on an operating shaft 26 and engaging a ring 27 set into the sleeve 19. The movement of the sleeve 19 to the left is limited by the engagement of the shoulder 28 with the ring or collar 24. The sleeve 19 has an extension 29 which has a sliding engagement with a T head 30 on the shaft 11 to form a coupling. The hub 15 and sleeve 18 are perforated to provide oil or grease passages, and a grease cup 31 is screwed on the sleeve shaft 19 to lubricate the bearings. It will be understood that the operating shaft 26 is provided with a lever or pedal whereby it may be rocked.

The spider hub 15 has mounted thereon or formed integral therewith a series of radial arms 35 and 36, the arms 36 being recessed as shown in Figs. 1 and 2. The arms 35 have rigidly secured thereto, as by riveting, pins 37 which slide in apertures formed in bosses 38 on the ring 21. These pins act as torsion devices to connect the clutch spider with the sleeve shaft 19, so that this clutch spider and sleeve shaft will turn together and with the shaft 11, at the same time permitting the sleeve shaft to slide with respect to the spider hub, which is held against endwise movement between the flywheel and the roller bearing 16. A pair of band clutch shoes 39 are mounted on the spider to engage the friction surface 13, and these clutch shoes form together an arc of nearly 360°. The arms 35 have mounted therein pins 40, which pins are preferably riveted in the arms and provided with collars 41. The pins engage radially extending slots 42 in radially extending lugs 43 on the brake shoes, and these slots are both longer and slightly wider than the diameters of the pins 40 as shown in Figs. 2 and 4. The lugs 43 are secured in position on the pins 40 by means of nuts 44 and washers 45 bearing against shoulders on the pins. A slight amount of play is allowed so that the clutch shoes can move a slight amount along the pins and transversely of the friction surface 13.

The arms 36 have mounted therein pins 47 which engage slots 48 in the arms. Each pin 47 is provided with a collar 49 bearing against one face of the arm, and with a reduced threaded portion 50 forming a shoulder against which bears a washer 51 secured in position by means of a nut 52. The pin 47 will thus have a movement radially of the arm and a slight movement circumferentially along the friction surface 13. The clutch shoes 39 are provided with end lugs 53 receiving bolts 54. The bolts 54 in the adjacent shoe ends are connected with the pin 47 by means of toggle links 55, shown in detail in Figs. 6 and 7. A clevis 56 is mounted on each pin 47, and this clevis is connected to lugs 57 on the ring 21 by means of a link 58 pivotally connected to the clevis and lugs by means of bolts 59 and 60 respectively. The link 58 forms a turn buckle of which 61 is the adjustable member. As shown in Fig. 5, there is a slight amount of end play between the clevis 56 and the link 58 to permit a slight movement of this clevis and the pin 47 along or circumferentially of the friction surface 13. As shown in Fig. 3, there is also a slight amount of end play of the clevis 56 and the links 55 on the pin 47. The mechanism is inclosed by a cover or shield 65 bolted to the fly wheel, and having an inwardly turned flange 66 coöperating with the periphery of the ring 21 to form a comparatively closed joint.

In operation the clutch is thrown in by moving the sleeve shaft 19 to the left, Fig. 2, and the clutch is thrown out by moving this sleeve shaft to the right. In automobile practice the clutch is normally thrown in by a strong spring, such as 23, and is thrown out by the clutch pedal. In Figs. 1 and 2 the clutch is shown thrown in. When the sleeve shaft 19 is moved to the left Fig. 2 to the position shown, the links 58 will be thrown from an inclined position to a vertical position, and will operate to straighten the toggle links 55 and at the same time move these toggle links bodily in a radial direction. Such a movement will operate to first move the shoes bodily in a radial direction along the arms 35, since the straightening action of these toggles is under the greatest leverage, and then after the shoes are in engagement with the friction surface, the ends of the shoes will move into engagement. When the sleeve shaft 19 is moved to the right, Fig. 2, the clutch shoes will be moved out of engagement with the friction surface 13, and in view of the positive connection between the shoes, and between the shoes and the sleeve shaft 19, the release will be positive. In the released position of the clutch the toggle links 55 will not only be broken so as to move the clutch shoes bodily inwardly along the arms 35, but the toggles will be moved bodily inwardly so as to move the ends of the clutch shoes inwardly. The mechanism will therefore operate to positively throw the clutch shoes out of engagement with the friction surface 13 at all points.

It will be noted that the clutch shoes are mounted intermediate their ends on the arms 35, so as not only to move freely toward and from the friction surface 13, but also to permit slight movement along and transversely of the friction surface. It will also be noted that the pin 47 and its links 55 not only have free movements toward and from the friction surface, but also along the friction surface. In addition as pointed out above the clevis 56 and the links 58 have a slight amount of end play on the pin 47 and with respect to the link 58. This permits free movement of the clutch shoes not only toward and from the friction surface 13, but also circumferentially along and transversely of the friction surface. This results in a uniform engagement of the clutch shoes with the friction surface. If for instance one clutch shoe or one clutch shoe end should engage the friction surface before the other clutch shoe or the other clutch shoe end, the former will become an abutment and will cause the latter to be thrown into engagement with the friction surface. Furthermore the slight amount of play allowed the clutch shoes along and transversely of the friction surface, due to the loose connection between the actuator and the shoes, and between the shoes and their center supports, permits these clutch shoes to adapt themselves to the friction surface and allows one clutch shoe to adapt itself to the other. The parts are therefore so constructed and arranged as to equalize the movements of the shoes into engagement with the friction surface and cause them to bear equally thereon. The clutch shoes will therefore engage the friction surface uniformly along the entire arc of substantially 360°. The positive connection of the clutch shoes with the sleeve shaft 19 results in a positive engagement and release of the clutch shoes. The engagement and release is under perfect control and permits the clutch to be engaged with any amount of pressure to "slip" the clutch any desired amount.

It is obvious that various changes may be made in the details of construction without departing from the spirit of this invention and it is to be understood that this invention is not to be limited to the specific construction shown and described.

Certain features of this invention are disclosed in my copending application, Serial Number 661,384, filed November 20, 1911, but the invention is claimed broadly in this application.

Having thus described the invention what is claimed is:

1. In a clutch, a pair of clutch members, one of said clutch members having a friction surface, a pair of flexible band shoes adapted to expand and engage said friction surface, means for supporting said shoes intermediate their ends on the other clutch member, constructed to permit free movement of said shoes at their points of support toward and from said friction surface, and means loosely connected to the free ends of said shoes for positively moving them toward and from said friction surface, constructed and arranged to equalize the movements of said shoes into engagement with said friction surface and cause them to bear equally on said friction surface.

2. In a clutch, a pair of clutch members, one of said clutch members having a friction surface, a pair of band shoes adapted to expand and engage said friction surface, means for supporting said shoes intermediate their ends on the other clutch member, constructed to permit free movement of said shoes at their points of support toward and circumferentially of said friction surface, and means loosely connected to the free ends of said shoes for moving them toward and from said friction surface, constructed and arranged to equalize the movements of said shoes into engagement with said friction surface and cause them to bear equally on said friction surface.

3. In a clutch, a pair of clutch members, one of said clutch members having a friction surface, a pair of band shoes adapted to expand and engage said friction surface, means for supporting said shoes intermediate their ends on the other clutch member, constructed to permit free movement of said shoes at their points of support toward, along, and transversely of said friction surface, and means connected to the free ends of said shoes for moving them toward and from said friction surface, constructed and arranged to equalize the movements of said shoes into engagement with said friction surface and cause them to bear equally on said friction surface.

4. In a clutch, a pair of clutch members, one of said clutch members having a friction surface, a pair of band shoes adapted to expand and engage said friction surface, means for supporting said shoes intermediate their ends on the other clutch member, constructed to permit free movement of said shoes at their points of support, an actuator, and links connecting the free ends of said shoes with said actuator, constructed and arranged to equalize the movements of said shoes into engagement with said friction surface and cause them to bear equally on said friction surface.

5. In a clutch, a pair of clutch members, one of said clutch members having a friction surface, a band shoe adapted to expand and engage said friction surface, means for supporting said band shoe intermediate its ends on the other clutch member, constructed to permit free movement of said shoe at its point of support toward and from said friction surface, and means connected to the free ends of said shoe for positively moving said shoe toward and from said friction surface, constructed and arranged to equalize the movements of the ends of said shoe into engagement with said friction surface.

6. In a clutch, a pair of clutch members, one of said clutch members having a friction surface, a band shoe adapted to expand and engage said friction surface, means for supporting said band shoe intermediate its ends on the other clutch member, constructed to permit free movement of said shoe at its point of support toward and along said friction surface, and means connected to the free ends of said shoe for positively moving said shoe toward and from said friction surface, constructed and arranged to permit said free ends to move circumferentially along said friction surface.

7. In a clutch, a pair of clutch members, one of said clutch members having a friction surface, a band shoe adapted to expand and engage said friction surface, means for supporting said band shoe intermediate its ends on the other clutch member, constructed to permit free movement of said shoe at its point of support toward, along, and transversely of said friction surface, and means connected to the free ends of said shoe for moving said shoe toward and from said friction surface, constructed and arranged to permit said free ends to move along and transversely of said friction surface.

8. In a clutch, a pair of clutch members, one of said clutch members having a friction surface, a band shoe adapted to expand and engage said friction surface, means for supporting said band shoe intermediate its ends on the other clutch member, constructed to permit free movement of said shoe at its point of support toward, along, and transversely of said friction surface, an actuator, links connecting said actuator with the free ends of said shoes, and means for supporting said links constructed to permit free movements thereof toward, along, and transversely of said friction surface.

9. In a clutch, a pair of clutch members, one of said clutch members having a friction surface, a band clutch ring adapted to expand and engage said friction surface, means for supporting said ring intermediate its ends on the other clutch member, constructed to permit free movement of said ring toward and from said friction surface at its point of support, toggle links connecting the free ends of said ring, an actuator connected to said toggle links, and means for supporting said toggle links on said second clutch member, constructed and arranged to permit free movement of said toggle links toward and from and circumferentially of said friction surface.

10. In a clutch, a pair of clutch members, one of said clutch members having a friction surface, a band clutch ring adapted to expand and engage said friction surface, means for supporting said ring intermediate its ends on the other clutch member, constructed to permit free movement of said ring toward and along said friction surface at its point of support, toggle links connecting the free ends of said ring, an actuator connected to said toggle links, and means for supporting said toggle links on said second clutch member, constructed and arranged to permit free movement of said toggle links toward and along said friction surface.

11. In a clutch, a pair of clutch members, one of said clutch members having a friction surface, a band clutch ring adapted to expand and engage said friction surface, means for supporting said ring intermediate its ends on the other clutch member, constructed to permit free movement of said ring toward, along, and transversely of said friction surface at its point of support, toggle links connecting the free ends of said ring, an actuator connected to said toggle links, and means for supporting said toggle links on said second clutch member, constructed and arranged to permit free movement of said toggle links toward, along, and transversely of said friction surface.

12. In a clutch, a pair of clutch members, one of said clutch members having a friction surface, a pair of clutch shoes adapted to move radially to engage said friction surface, means for supporting said shoes on the other clutch member, constructed to permit free movement of said shoes at their points of support toward and circumferentially of said friction surface, and means loosely connected to said shoes for moving them into engagement with said friction surface, constructed and arranged to equalize the movements of said shoes into engagement with said friction surface and cause them to bear equally on said friction surface.

13. In a clutch, a pair of clutch members, one of said clutch members having a friction surface, a pair of clutch shoes adapted to move radially to engage said friction surface, means for supporting said shoes on the other clutch member, constructed to permit free movement of said shoes at their points of support toward, transversely and circumferentially of said friction surface, and means loosely connected to said shoes for moving them into engagement with said friction surface, constructed and arranged to equalize the movements of said shoes into engagement with said friction surface and cause them to bear equally on said friction surface.

14. In a clutch, a pair of clutch members, one of said clutch members having a friction surface, a clutch shoe adapted to expand and engage said friction surface, means for supporting said clutch shoe intermediate its ends on the other clutch member, constructed to permit free movement of said shoe at its point of support toward and circumferentially of said friction surface, and means loosely connected to the free ends of said shoe for moving said shoe into engagement with said friction surface, constructed and arranged to center said shoe and equalize the movements of the ends of said shoe into engagement with said friction surface.

15. In a clutch, a pair of clutch members, one of said clutch members having a friction surface, a clutch shoe adapted to expand and engage said friction surface, means for supporting said clutch shoe intermediate its ends on the other clutch member, constructed to permit free movement of said shoe at its point of support toward, transversely and circumferentially of said friction surface, and means loosely connected to the free ends of said shoe for moving said shoe into engagement with said friction surface, constructed and arranged to center said shoe and equalize the movements of the ends of said shoe into engagement with said friction surface.

16. In a clutch, a pair of clutch members, one of said clutch members having a friction surface, a pair of clutch shoes adapted to move radially to engage said friction surface, means for supporting said shoes intermediate their ends on the other clutch member, constructed to permit free movement of said shoes at their points of support toward and circumferentially of said friction surface, and means loosely connected to the free ends of said shoes for moving them into engagement with said friction surface, constructed and arranged to equalize the movements of said shoes into engagement with said friction surface and cause them to bear equally on said friction surface.

17. In a clutch, a pair of clutch members, one of said clutch members having an inside friction surface, a pair of flexible band shoes adapted to expand and engage said friction surface, means for supporting said shoes intermediate their ends on the other clutch member, constructed to permit free movement of said shoes at their points of support toward and from said friction surface, and means loosely connected to the free ends of said shoes for expanding and moving them uniformly along their entire lengths radially toward said friction surface, constructed and arranged to equalize the movements of said shoes into engagement with said friction surface and cause them to bear equally on said friction surface.

18. In a clutch, a pair of clutch members, one of said clutch members having an inside friction surface, a pair of flexible band shoes adapted to expand and engage said friction surface, means for supporting said shoes intermediate their ends on the other clutch member, constructed to permit free movement of said shoes at their points of support toward and from said friction surface, and means loosely connected to the free ends of said shoes for moving them radially toward and from said friction surface, constructed and arranged to equalize the movements of said shoes and cause them to bear equally on the friction surface.

19. In a clutch, a pair of clutch members, one of said clutch members having an inside friction surface, a pair of flexible band shoes adapted to expand and engage said friction surface, means for supporting said shoes intermediate their ends on the other clutch member, constructed to permit free movement of said shoes at their points of support toward and from said friction surface, a clutch actuator, and means connecting the free ends of said shoes with said actuator for expanding and moving said shoes into engagement with said friction surface, constructed and arranged to permit independent movement of the ends of said shoes to equalize the movement of said shoes into engagement with said friction surface and cause them to bear equally on said friction surface.

20. In a clutch, a pair of clutch members, one of said clutch members having an inside friction surface, a pair of flexible band shoes adapted to expand and engage said friction surface, means for supporting said shoes intermediate their ends on the other clutch member for pivotal and radial sliding movement toward and from said friction surface, a clutch actuator, and means connecting the free ends of said shoes with said actuator for expanding and moving said shoes into engagement with said friction surface, constructed and arranged to permit independent movement of the ends of said shoes into engagement with said friction surface and cause them to bear equally on said friction surface.

In testimony whereof I affix my signature in the presence of these two witnesses.

OTTO G. PFEIFFER.

Witnesses:
J. H. BRUNINGA,
O. J. GROEBEL, Jr.

Copies of this patent may be obtained for five cents each, by addressing the "Commissioner of Patents, Washington, D. C."